US008909805B2

(12) United States Patent
Thang et al.

(10) Patent No.: US 8,909,805 B2
(45) Date of Patent: *Dec. 9, 2014

(54) APPARATUS AND METHOD FOR PROVIDING STREAMING CONTENT

(75) Inventors: Truong Cong Thang, Daejeon (KR); Jin Young Lee, Daejeon (KR); Seong Jun Bae, Daejeon (KR); Jung Won Kang, Daejeon (KR); Soon Heung Jung, Daejeon (KR); Sang Taick Park, Daejeon (KR); Won Ryu, Daejeon (KR); Jae Gon Kim, Goyang-si (KR)

(73) Assignees: Electronics and Telecommunications Research Institute, Daejeon (KR); Industry-University Cooperation Foundation Korea Aerospace University, Gyeonggi-do (KR)

( * ) Notice: Subject to any disclaimer, the term of this patent is extended or adjusted under 35 U.S.C. 154(b) by 0 days.
This patent is subject to a terminal disclaimer.

(21) Appl. No.: 13/824,995
(22) PCT Filed: Oct. 6, 2011
(86) PCT No.: PCT/KR2011/007387
§ 371 (c)(1),
(2), (4) Date: Mar. 18, 2013
(87) PCT Pub. No.: WO2012/047028
PCT Pub. Date: Apr. 12, 2012

(65) Prior Publication Data
US 2013/0185398 A1 Jul. 18, 2013

Related U.S. Application Data

(60) Provisional application No. 61/434,036, filed on Jan. 19, 2011, provisional application No. 61/417,931, filed on Nov. 30, 2010, provisional application No. 61/414,462, filed on Nov. 17, 2010, provisional application No. 61/405,674, filed on Oct. 22, 2010, provisional application No. 61/390,328, filed on Oct. 6, 2010.

(30) Foreign Application Priority Data

Oct. 4, 2011 (KR) ........................ 10-2011-0100706

(51) Int. Cl.
G06F 15/16 (2006.01)
H04N 21/61 (2011.01)
H04N 21/43 (2011.01)
H04L 29/06 (2006.01)
H04N 21/235 (2011.01)
H04N 21/2343 (2011.01)
H04N 21/84 (2011.01)
G06Q 90/00 (2006.01)
H04L 29/08 (2006.01)
H04N 21/845 (2011.01)
H04N 21/8541 (2011.01)

(52) U.S. Cl.
CPC ............ *H04L 65/60* (2013.01); *H04N 21/6125* (2013.01); *H04N 21/43* (2013.01); *H04L 65/4069* (2013.01); *H04N 21/2358* (2013.01); *H04N 21/23439* (2013.01); *H04L 65/80* (2013.01); *H04N 21/84* (2013.01); *H04L 65/4092* (2013.01); *G06Q 90/00* (2013.01); *H04L 67/02* (2013.01); *H04L 65/4084* (2013.01); *H04N 21/845* (2013.01); *H04N 21/8541* (2013.01)
USPC .......................................... 709/230; 709/231

(58) Field of Classification Search
USPC ......... 709/203, 217, 218, 223–229, 219, 231, 709/236, 21, 230; 725/716, 723
See application file for complete search history.

(56) References Cited

U.S. PATENT DOCUMENTS 7,512,665 B1 * 3/2009 Cragun .......................... 709/217
7,552,228 B2 * 6/2009 Parasnis et al. ............... 709/231
(Continued)

FOREIGN PATENT DOCUMENTS

JP 2005-020588 A 1/2005
JP 2008-259001 A 10/2008
KR 1020050055820 A 6/2005

OTHER PUBLICATIONS

Universal Mobile Telecommunications System, ETSI TS 126 234, V9.3.0, Jun. 2010.
*Primary Examiner* — Jimmy H Tran
(74) *Attorney, Agent, or Firm* — William Park & Associates Patent Ltd.

(57) ABSTRACT

A method and apparatus for an adaptive Hypertext Transfer Protocol (HTTP) streaming service using metadata of media content are provided. The media content may include a sequence of one or more periods. The metadata may include a start time attribute and/or a duration attribute of each of the periods. The metadata may determine a start time of each of the periods, and a start time of each of segments included in each of the periods. A terminal may access segments included in each of the periods, may decode and render data of media content included in the segments, and may play back the media content.

4 Claims, 5 Drawing Sheets

(56) References Cited

U.S. PATENT DOCUMENTS

| | | | |
|---|---|---|---|
| 7,624,337 B2* | 11/2009 | Sull et al. | 715/201 |
| 7,725,829 B1* | 5/2010 | Wong et al. | 715/726 |
| 7,823,055 B2* | 10/2010 | Sull et al. | 715/201 |
| 8,201,204 B2* | 6/2012 | Connery et al. | 725/87 |
| 8,209,609 B2* | 6/2012 | Dunton et al. | 715/716 |
| 8,230,343 B2* | 7/2012 | Logan et al. | 715/723 |
| 8,365,271 B2* | 1/2013 | Blum et al. | 726/12 |
| 8,468,145 B2* | 6/2013 | Fedorynski et al. | 707/709 |
| 8,533,310 B2* | 9/2013 | Huang et al. | 709/223 |
| 8,635,360 B2* | 1/2014 | Brase et al. | 709/232 |
| 2003/0093790 A1* | 5/2003 | Logan et al. | 725/38 |
| 2004/0064577 A1* | 4/2004 | Dahlin et al. | 709/235 |
| 2005/0005308 A1* | 1/2005 | Logan et al. | 725/135 |
| 2005/0076136 A1* | 4/2005 | Cho et al. | 709/231 |
| 2005/0102371 A1* | 5/2005 | Aksu | 709/217 |
| 2005/0193408 A1* | 9/2005 | Sull et al. | 725/32 |
| 2005/0193425 A1* | 9/2005 | Sull et al. | 725/135 |
| 2005/0203927 A1* | 9/2005 | Sull et al. | 707/100 |
| 2005/0204385 A1* | 9/2005 | Sull et al. | 725/45 |
| 2005/0273514 A1* | 12/2005 | Milkey et al. | 709/232 |
| 2006/0235883 A1* | 10/2006 | Krebs | 707/104.1 |
| 2007/0003251 A1* | 1/2007 | Chung et al. | 386/96 |
| 2007/0033170 A1* | 2/2007 | Sull et al. | 707/3 |
| 2007/0033292 A1* | 2/2007 | Sull et al. | 709/238 |
| 2007/0033515 A1* | 2/2007 | Sull et al. | 715/500.1 |
| 2007/0033521 A1* | 2/2007 | Sull et al. | 715/523 |
| 2007/0033533 A1* | 2/2007 | Sull | 715/752 |
| 2007/0038612 A1* | 2/2007 | Sull et al. | 707/3 |
| 2007/0044010 A1* | 2/2007 | Sull et al. | 715/500.1 |
| 2008/0034424 A1* | 2/2008 | Overcash et al. | 726/22 |
| 2008/0050096 A1* | 2/2008 | Ryu | 386/99 |
| 2008/0126943 A1* | 5/2008 | Parasnis et al. | 715/730 |
| 2008/0155602 A1* | 6/2008 | Collet et al. | 725/46 |
| 2008/0222244 A1* | 9/2008 | Huang et al. | 709/203 |
| 2008/0313227 A1* | 12/2008 | Shafton et al. | 707/104.1 |
| 2009/0217354 A1* | 8/2009 | Blum et al. | 726/3 |
| 2010/0169303 A1* | 7/2010 | Biderman et al. | 707/723 |
| 2010/0174823 A1* | 7/2010 | Huang | 709/230 |
| 2010/0235472 A1* | 9/2010 | Sood et al. | 709/219 |
| 2010/0235528 A1* | 9/2010 | Bocharov et al. | 709/231 |
| 2010/0262618 A1 | 10/2010 | Hedinsson | |
| 2011/0093492 A1* | 4/2011 | Sull et al. | 707/769 |
| 2011/0307545 A1* | 12/2011 | Bouazizi | 709/203 |
| 2012/0016965 A1* | 1/2012 | Chen et al. | 709/219 |
| 2012/0042050 A1* | 2/2012 | Chen et al. | 709/219 |
| 2012/0042091 A1* | 2/2012 | McCarthy et al. | 709/231 |
| 2012/0124179 A1* | 5/2012 | Cappio et al. | 709/219 |
| 2012/0284371 A1* | 11/2012 | Begen et al. | 709/219 |

* cited by examiner

APPARATUS AND METHOD FOR PROVIDING STREAMING CONTENT

TECHNICAL FIELD

The present invention relates to a technology for providing streaming content, and more particularly, to an apparatus and method for providing media content using adaptive streaming.

BACKGROUND ART

Streaming is one of schemes for transmitting and playing back multimedia content such as sounds, moving images, and the like. A client may play back content while receiving the content through the streaming.

An adaptive streaming service refers to providing a streaming service employing a communication scheme with a request of a client and a response of a server in response to the request.

The client may request a media sequence suitable for an environment of the client (for example, a transmission channel of the client), using the adaptive streaming service. The server may provide a media sequence matched to the request of the client among media sequences with various qualities that are included in the server.

The adaptive streaming service may be provided based on various protocols.

A Hypertext Transfer Protocol (HTTP) adaptive streaming service refers to an adaptive streaming service provided based on an HTTP protocol. A client of the HTTP adaptive streaming service may receive content from a server using the HTTP protocol, and may transmit a request associated with a streaming service to the server.

DISCLOSURE OF INVENTION

Technical Goals

An aspect of the present invention provides an apparatus and method that may play back media including a sequence of one or more periods, using segments that are classified for each period.

Another aspect of the present invention provides an apparatus and method that may use metadata that represents a start time attribute and/or a duration attribute of each of one or more periods, to play back media including a sequence of the one or more periods.

Technical Solutions

According to an aspect of the present invention, there is provided a method for providing media, the method including: receiving metadata of media, the metadata including one or more periods; accessing segments of the media based on information provided by the metadata; and decoding and rendering data of the media that is included in the segments, wherein each of the periods includes one or more representations of the media, and wherein each of the representations starts from a beginning point of a period and continues to an ending point of the period, and includes one or more segments.

The metadata may be a Media Presentation Description (MPD) of the media.

Each of the periods may be defined by a period element.

The period element may include a start attribute indicating a start time of a period.

The period element may include a duration attribute indicating a duration of a period.

The duration attribute may specify a start time of a period subsequent to the period.

The start time of the period may determine a start time of each of segments included in the period.

The period element may include a reference attribute indicating a reference to an external period element, and each of the periods may be defined by the external period element.

According to another aspect of the present invention, there is provided a terminal, including: an access engine to receive metadata of media, to receive segments of the media based on information provided by the metadata, and to decode data of the media that is included in the segments, the metadata including one or more periods; and a media engine to receive the data of the media from the access engine, and to output the media, wherein each of the periods includes one or more representations of the media, and wherein each of the representations starts from a beginning point of a period and continues to an ending point of the period, and includes one or more segments.

Effect of the Invention

According to embodiments of the present invention, it is possible to use segments included in each of one or more periods, to play back media including a sequence of the one or more periods.

Additionally, according to embodiments of the present invention, it is possible to use metadata that represents a start time attribute and/or a duration attribute of each of one or more periods, to play back media including a sequence of the one or more periods.

BEST MODE FOR CARRYING OUT THE INVENTION

Figure 1:
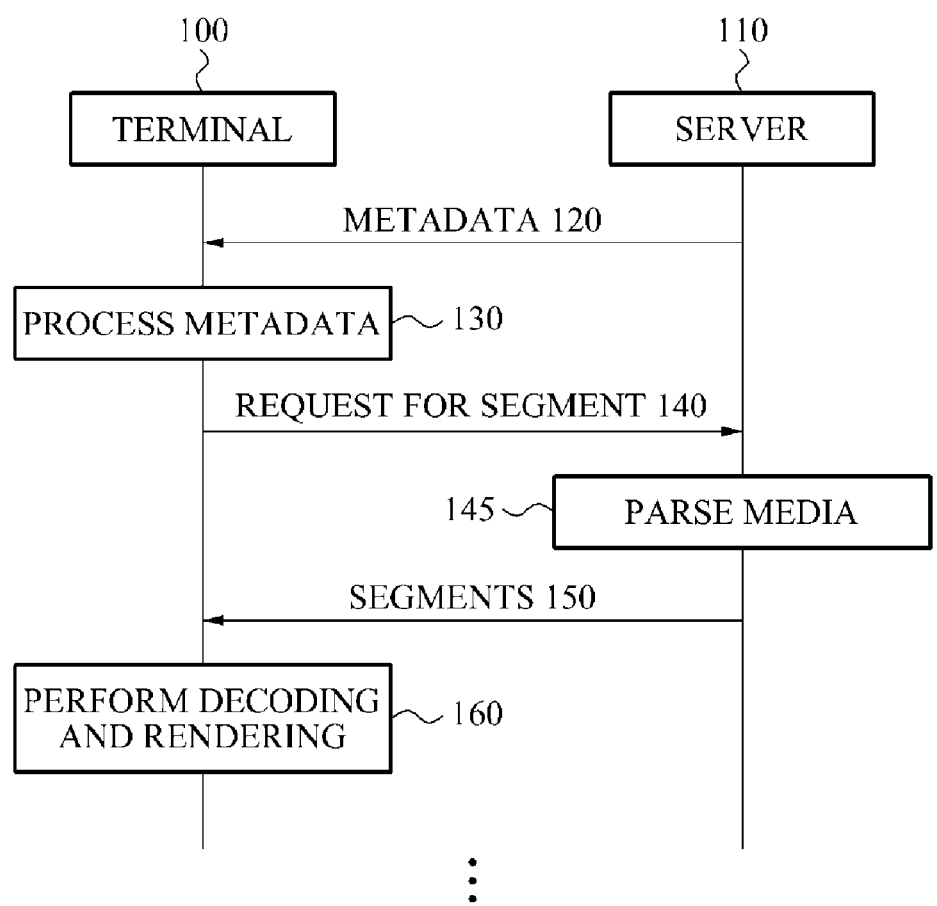
FIG. 1 is a signal flowchart illustrating a content processing method according to an embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

A Dynamic Adaptive Streaming over HTTP (DASH) may specify formats that enable 1) delivery of media content from an HTTP server to an HTTP client, and enable 2) caching of content by standard HTTP caches.

A media component may be an encoded version of individual media types, such as audios, videos, or timed texts with specific attributes, for example bandwidths, languages, or resolutions.

Media content may be a set of media components having a common timeline, for example audios, videos, or timed texts. Additionally, media components may have relationships on how the media components may be presented (for example, individually, jointly, or mutually exclusive) as programs or movies.

Hereinafter, media content, media, and content may be used as interchangeable terms.

A media presentation (or media) may be a structured collection of data used to establish bounded or unbounded presentation of media content including components of continuous media.

In other words, the media presentation may be a structured collection of data that is accessible to a DASH client in order to provide a streaming service to a user.

A Media Presentation Description (MPD) may be a formalized description for a media presentation.

The media presentation may be described by an MPD including possible updates of the MPD.

Content may be content on demand, or live content.

The content may be divided into one or more intervals. In other words, the content may include one or more intervals.

Hereinafter, intervals may be interchangeable with periods. The term period may be used as a term in $3^{rd}$ Generation Partnership Project (3GPP) adaptive HTTP streaming. In other words, a period may be an interval of a media presentation. A continuous sequence of all periods may constitute the media presentation.

In other words, the media presentation may include one or more periods. Alternatively, the media presentation may include a sequence of one or more periods.

One or more intervals may be a basic unit. One or more intervals may be described by signaling metadata. In other words, metadata may describe each of the one or more intervals.

The metadata may be an MPD.

The MPD may define a format to announce resource identifiers for segments. The MPD may provide a context for identified resources within the media presentation. The resource identifiers may be HTTP-Uniform Resource Locators (URLs). URLs may be restricted by a byte range attribute.

Each interval may be divided into segments. Hereinafter, segments may be interchangeable with fragments. The term segment may be used as a term of 3GPP adaptive HTTP streaming.

A segment may refer to an entity body of a response to an HTTP/1.1 GET request for an HTTP-URL, for example as defined in RFC 2616, (or a GET request for a part indicated by a byte range).

A terminal may play back media content using received bytes (namely, a segment).

A sub-segment may refer to a smallest unit within segments that may be indexed by a segment index at the segment level.

Two or more sets of fragments corresponding to a single interval may exist. Each of the sets may be called an alternative.

An alternative may be interchangeable with a representation (or an expression).

Each period may include one or more groups.

Each group may include one or more representations of the same media content. Accordingly, each period may include one or more representations of media content.

Hereinafter, groups may be interchangeable with adaptation sets.

A representation may refer to a structured collection of one or more media components within a single period. In other words, a representation may be one of alternative choices of a complete set or subset of media content components forming media content during a defined period. A representation may include one or more media streams. Each of the media streams may be an encoded version of a single media content component.

A representation may start from a beginning point of a period (namely, a period including the representation), and may continue to an ending point of the period.

A representation may be one of alternative choices of the media content or a subset of the media content typically differing by the encoding choice, for example by a bitrate, a resolution, a language, a codec, and the like.

An MPD (or an MPD element) may provide descriptive information that enables a client to select one or more representations.

A Random Access Point (RAP) may be a specific location in a media segment. The RAP may be identified as a location in which playback may be started continuously from a location of the RAP using only information included in a media segment.

Each representation may be formed of one or more segments. In other words, a representation may include one or more segments.

An MPD may be a document including metadata required to a DASH client to form appropriate HTTP-URLs in order to 1) access segments and to 2) provide a user with a streaming service. The HTTP-URLs may be absolute or relative.

The MPD may be an Extensible Markup Language (XML)-document.

The MPD may include an MPD element. The MPD may include only a single MPD element.

FIG. 1 is a signal flowchart illustrating a content processing method according to an embodiment of the present invention.

A terminal 100 may be a DASH client.

The DASH client may be compatible with a client specified in RFC 2616.

The DASH client may typically use an HTTP GET method or an HTTP partial GET method, as specified in RFC 2616, to access segments or parts of segments.

A server 110 may perform hosting on DASH segments. The server 110 may be compatible with a server specified in RFC 2616.

In operation 120, the terminal 100 may receive metadata of media (or content) from the server 110. In other words, the server 110 may transmit the metadata of the media to the terminal 100. The media may include one or more periods.

The metadata may include BaseURL elements. One or more BaseURL elements may be provided.

In operation 130, the terminal 100 may process the received metadata. In operation 130, the terminal 100 may extract information provided by the metadata, or information included in the metadata.

In operations 140 through 150, the terminal 100 may access a segment of the media based on the information provided by the metadata.

Each of the periods may include one or more groups, and each of the groups may include one or more representations of the media. In other words, each of the periods may include the one or more representations of the media. Accordingly, each of the representations may start from a beginning point of a period including each of the representations, and may continue to an ending point of the period. Each of the representations may include one or more segments.

Each of the periods may be defined by a period element.

The period element may include a start attribute indicating a start time of a period. Additionally, the period element may include a duration attribute indicating a duration of a period.

To specify a start time of a first period among one or more periods, the following methods 1) through 3) may be applied. Hereinafter, a second period may be subsequent to the first period.

Method 1): When a start attribute exists in a first period element of the first period, a start time of the first period may be equivalent to a value of the start attribute.

Method 2): When a start attribute does not exist in the first period element of the first period, and when a second period element of the second period includes a duration attribute, the start time of the first period may be obtained by adding a value of the duration attribute of the second period element to a start time of the second period. Accordingly, a duration attribute of a period may specify a start time of a period subsequent to the period.

Method 3): When a start attribute does not exist in the first period element of the first period, and when the first period is the first of the one or more periods, the start time of the first period may be 0.

The period element may include a reference attribute indicating a reference to an external period element. A period may be defined by the external period element.

In operation 140, the terminal 100 may send a request for a segment of the media to the server 110 using a URL of the segment. The URL may be resolved with respect to one of the above-described BaseURL elements. For example, the URL of the segment may be generated based on a BaseURL element.

The terminal 100 may request the server 110 to transmit a segment suitable for a specific interval based on the processed metadata. In other words, the requested segment may be selected based on the metadata. The terminal 100 may perform the HTTP GET method, to request the server 110 to transmit the segment.

The metadata may include a range attribute. The request may include a request for bytes of a resource indicated by a URL that are designated by the range attribute.

The URL of the segment may be an absolute URL or a relative URL.

Identical segments may be accessible at multiple locations indicated by URLs resolved with respect to the respective BaseURL elements. In other words, identical segments may be selectively accessible by the URLs provided by the BaseURL elements.

Additionally, a first BaseURL element among the BaseURL elements may be used as a basic Universal Resource Indicator (URI), and BaseURL elements other than the first BaseURL element may be used as alternative BaseURL elements.

The metadata may selectively include a sourceURL attribute of the segment. When the metadata selectively includes the sourceURL attribute of the segment, a BaseURL element among the BaseURL elements may be mapped to the sourceURL attribute, so that the URL of the segment may be generated.

In operation 145, in several cases, the server 110 may need to parse content (for example, a Moving Picture Experts Group (MPEG) layer 4 (MP4) file for Scalable Video Coding (SVC)), and may extract a data part suitable for the requested segment.

In operation 150, the server 110 may transmit, to the terminal 100, segments suitable for each request from the terminal 100. The terminal 100 may receive the segments from the server.

In operation 160, the terminal 100 may perform decoding and rendering on data of the media included in the segment, to play back the media.

A start time of a period may determine a start time of each of segments included in the period. Accordingly, to play back media using segments, the terminal 100 may determine a playback time based on a start time of a period including the segments.

The terminal 100 may play back the media using the received segments by repeating operations 120 through 160.

Here, a BaseURL element may include an MPD level BaseURL element of an MPD, and a period level BaseURL element of each period. The period level BaseURL element may refer to a BaseURL element applied to a period to which the period level BaseURL element belongs. In other words, a URL of a segment included in each period may be resolved with respect to the period level BaseURL element.

One or more MPD level BaseURL elements may be provided, and one or more period level BaseURL elements may be provided.

Additionally, the BaseURL element may further include a group level BaseURL element of a group. A URL of a segment included in each group may be resolved with respect to the group level BaseURL element. One or more group level BaseURL elements may be provided.

The BaseURL element may further include a representation level BaseURL element of a representation. A URL of a segment included in each representation may be resolved with respect to the representation level BaseURL element.

A BaseURL element of a specific level may be resolved with respect to a BaseURL element of a higher level. For example, a period level BaseURL element may be resolved with respect to an MPD level BaseURL element. A group level BaseURL element may be resolved with respect to a period level BaseURL element. A representation level BaseURL element may be resolved with respect to a group level BaseURL element or a period level BaseURL element.

Figure 2:
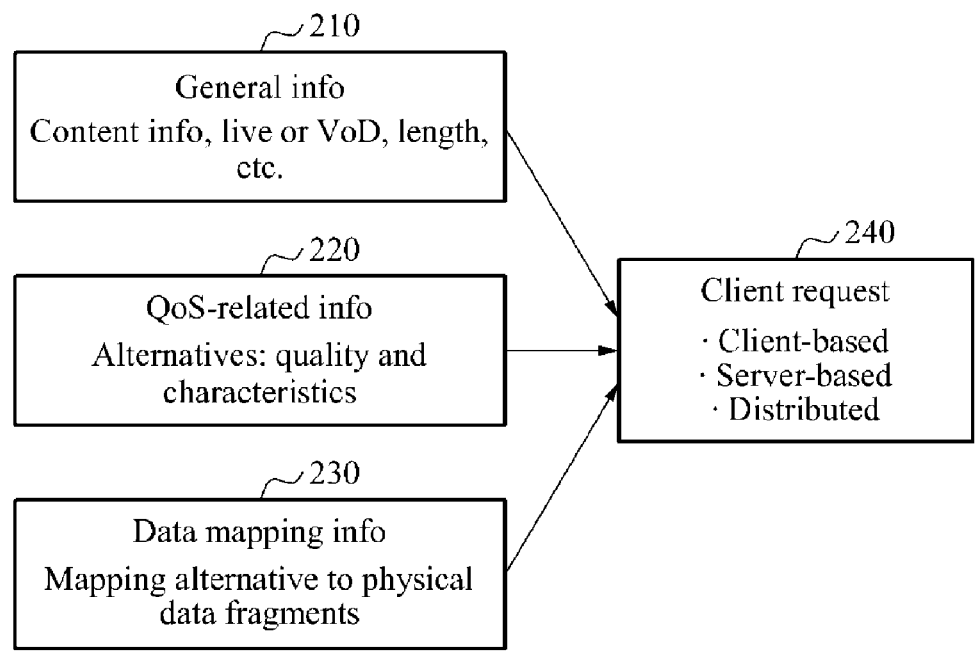
FIG. 2 is a diagram illustrating categories of signaling information according to an embodiment of the present invention.

FIG. 2 is a diagram illustrating categories of signaling information according to an embodiment of the present invention.

The signaling information (namely, metadata) may be divided into the following categories 1) through 4):

1) General information 210: includes common description of content, and general description of each interval, such as a duration, and a start time.

2) Quality of Service (QoS) information 220: describes characteristics of each alternative, such as a bitrate, a resolution, and a quality. In other words, the QoS information describes characteristics of each of alternatives of content.

An alternative may be physical (namely, created in advance), or may be virtual (namely, to be created on the fly). Based on information of alternatives, the client may select a fragment of an appropriate alternative. Accordingly, adaptivity to contexts of terminals and networks may be supported.

3) Mapping information 230: describes locations to retrieve content. Depending on specific cases, different alternatives may have the same or different locations.

4) Client request 240: this type of signaling information may conform to a format of HTTP 1.1 request message. As shown in FIG. 1, parameters requested by the client may be derived from the information of categories 1) through 3).

Figure 3:
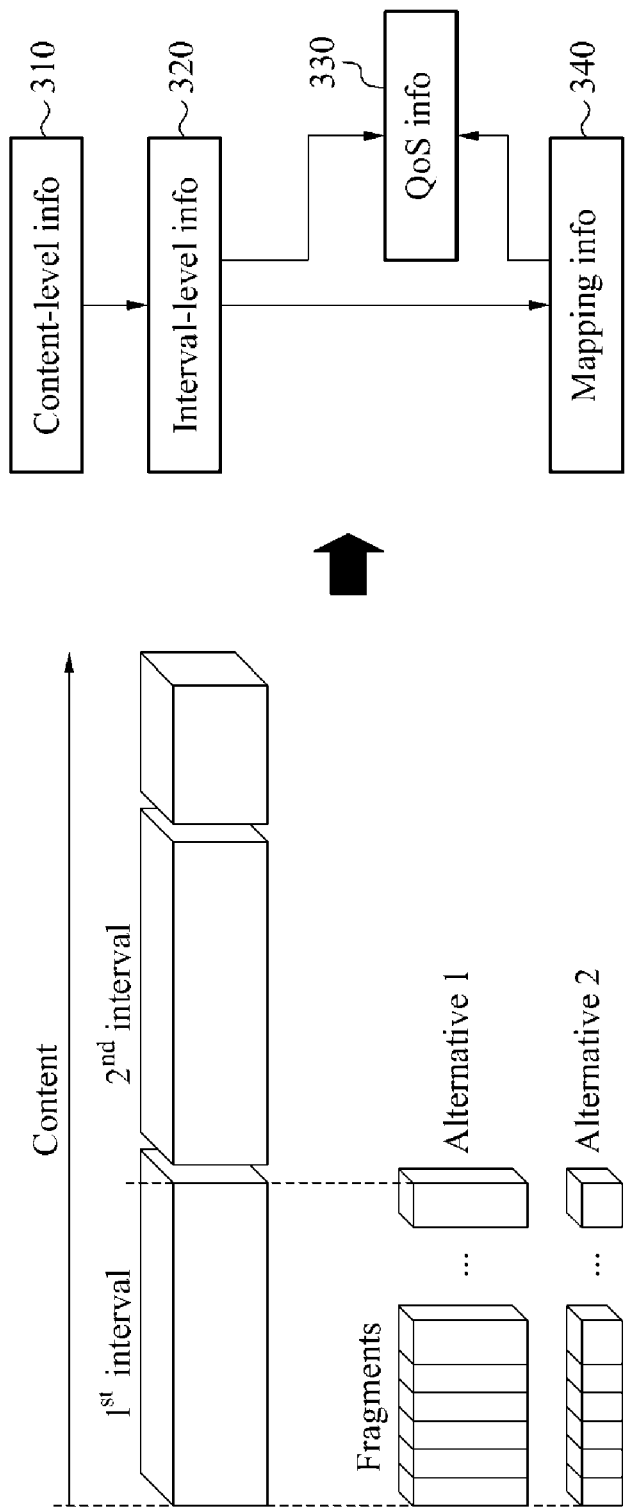
FIG. 3 is a diagram illustrating a hierarchy of content division and levels of signaling information according to an embodiment of the present invention.
Figure 4:
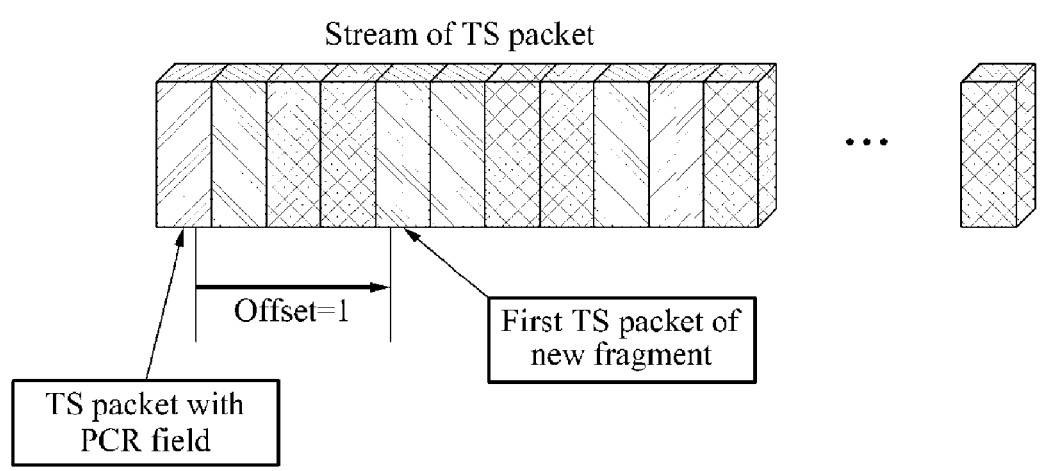
FIG. 4 is a diagram illustrating detection of virtual boundaries in a Moving Picture Experts Group-2 Transport Stream (MPEG-2 TS) according to an embodiment of the present invention.

FIG. 3 is a diagram illustrating a hierarchy of content division and levels of signaling information according to an embodiment of the present invention.

Signaling of metadata according to an embodiment of the present invention may be physically separated into content-level information 310, interval-level information 320, QoS information 330, and mapping information 340. Linking of related parts of the content-level information 310, the interval-level information 320, the QoS information 330, and the mapping information 340 may be performed by reference.

These parts of signaling information may be combined in different ways to support the flexibility.

For example, when only the content-level information 310 and interval-level information 320 are sent to a client, all computations for deciding alternatives and resolving locations may be performed by a server. Accordingly, when only the content-level information 310 and interval-level information 320 are sent to the client, a processing model may be "server-based."

When the content-level information 310, the interval-level information 320, and the QoS information 330 are sent to the client, all computations for deciding alternatives and resolving locations may be distributed and performed by the client and the server. Accordingly, when the content-level information 310, the interval-level information 320, and the QoS information 330 are sent to the client, the model may be "distributed."

When all the signaling information (namely, the content-level information 310, the interval-level information 320, the QoS information 330, and the mapping information 340) is sent to the client, the model may be client-based, because most (or all) processing (namely, computations for deciding alternatives and resolving locations) is performed by the client.

The separation of metadata parts may enable efficiency in storage and delivery. For example, during a session, metadata of the content-level information 310 may be sent once, and only the interval-level information 320 may be periodically updated. Similarly, a single file containing the QoSInfo 330 may be used for different intervals and different contents.

There are different ways to represent a set of metadata, for example XML, pseudo-code, a Session Description Protocol (SDP), and the like.

In embodiments of the present invention, both XML and pseudo-code may be used to represent signaling syntax. XML syntax may be used for clients that support an XLM profile based on an MPEG-21 and similar schema. On the other hand, pseudo-code syntax may be based on a "language" of an International Organization for Standardization (ISO) base media file format and the like, and may be used in non-XML clients. In particular, a profile of the pseudo-code syntax may employ a parsing module similar to a parsing module of file-format parsing. To design the syntax for the above purpose, a table of common elements may be defined and elements in each format may be represented, in the following embodiments.

The proposed syntax may be represented by any other languages.

Hereinafter, tables of general syntax elements will be described.

In the following tables, the syntax elements may be described hierarchically. In other words, a child element may be shown in a column on the right of a parent element of the child element. "Leaf"-level elements may be shown in italic, and parent elements may be shown in bold letter. A parent element may be represented by a corresponding XML type and a file box.

In the column of occurrence, "0 . . . N" may mean that the number of instances of an occurrence element may be from 0 to "unbounded." The minimum occurrence of 0 may mean that an element may be optional (namely, not present). A minimum occurrence equal to or greater than 1 may mean that an element is mandatory in the syntax.

Occurrence may be interchangeable with cardinality.

In a row of type, A indicates an attribute, and E indicates an element. In a row of optionality, M indicates mandatory, and O indicates optional. For attributes, M indicates mandatory, O indicates optional, OD indicates optional with default value, and CM indicates conditionally mandatory. For elements, elements may be represented as <minOccurs> . . . <maxOccurs>. Here, N may be unbounded.

The above meaning may equally be applied to other tables in the present specification.

Additionally, QoSInfo may be also called AdaptationInfo to make QoSInfo more specific. Moreover, a few elements may be revised to increase flexibility of the syntax.

The following Table 1 describes general information.

TABLE 1

| | | | Occurrence | Semantics | XML syntax (based on MPEG-21) | Pseudo-code (File format box) |
|---|---|---|---|---|---|---|
| HttpStr | | | 1 | Describes the top-level element of signaling metadata for HTTP streaming | HttpStreamingType | 'htps' box |
| | General-Info | | 0 . . . N | Contains the general information of the described content | GeneralInfoType | 'geni' box |
| | | TimeScale | 0 . . . 1 | Describes the number of time units in 1 second. This value is used with time-related elements, when a time unit is not specified. | integer | unsigned int(32) |
| | | LiveStartTime | 0 . . . 1 | If LiveStartTime element is not present, the content is of VoD type. The presence of LiveStartTime element indicates a live content that is to be displayed at a time value of LiveStartTime. If LiveStartTime has a time value of 0, the display time is unknown. | dateTime | unsigned int(64) |

TABLE 1-continued

| | | Occurrence | Semantics | XML syntax (based on MPEG-21) | Pseudo-code (File format box) |
|---|---|---|---|---|---|
| | Duration | 0 . . . 1 | If present, indicates duration of the content. Otherwise, the duration is unknown. | integer | unsigned int(32) |
| | DefaultInt-Duration | 0 . . . 1 | If present, indicates a default duration of each interval of the content. | integer | unsigned int(32) |
| | MinUpdate-Time | 0 . . . 1 | If present, indicates the minimum waiting time before requesting the main description file again. | integer | unsigned int(32) |
| | Consistent-QoSInfo | 0 . . . 1 | If true, indicates that QoS information is the same as the whole content duration. | boolean | flag of the box |
| | Default-Content-Loc | 0 . . . 1 | Provides a default location for the content. | anyURI | string of URL |
| Intervals-Ref | | 0 . . . N | Provides reference to description containing one or more instances of Interval element. One or more instances of Interval element represent a sequence of consecutive interval(s). | Intervals-RefType | 'iref' box |
| Interval | | 0 . . . N | Provides information of an interval of content. The information of the interval may be either included as an instance of Interval element or referenced by IntervalsRef element. | IntervalType | 'intv' box |
| | IntervalInfo | 0 . . . 1 | Provides general information of an interval. | IntervalInfo-Type | 'inti' box |
| | QoSInfo-Ref | 0 . . . 1 | Provides reference to description represented by QoSInfo element. If QosInfoRef element is present, QoSInfo element may not be present at the same level. | dia:Reference-Type | 'qref' box |
| | QoSInfo | 0 . . . 1 | Provides information about alternatives of content, such as resource characteristics and quality/utility. If QoSInfo element is present, QoSInfoRef element may not be present. | QoSInfoType | 'QoSi' box |
| | Mapping-InfoRef | 0 . . . 1 | Provides reference to description represented by MappingInfo element. If MappingInfoRef element is present, MappingInfo element may not be present at the same level. | dia:Reference-Type | 'mref' box |
| | Mapping-Info | 0 . . . 1 | Provides information about locations of content alternatives. If the information is not provided, DefaultContentIntLoc element (if not, DefaultContentLoc) can be used to retrieve content. If MappingInfo element is present, MappingInfoRef element may not be present. | MappingInfo-Type | 'mapi' box |
| | NextIntervalsRef | 0 . . . 1 | Provides reference to information of next interval(s). The information of next interval(s) is description containing one or more instances of Interval element. The information of next interval(s) is description represented by Interval element. Using NextIntervalsRef element, the client does not need to reload the main description represented by HttpStr element. Within the current time window, only the final interval may contain NextIntervalsRef element. | Intervals-RefType, may be extended from dia:Reference-Type | 'nref' box |

TABLE 1-continued

|  | Occurrence | Semantics | XML syntax (based on MPEG-21) | Pseudo-code (File format box) |
|---|---|---|---|---|
| Previous-Intervals-Ref | 0 . . . 1 | Provides reference to information of previous interval(s). The information of next interval(s) is description containing one or more instances of Interval element. The information of next interval(s) is description represented by Interval element. Using PreviousIntervalsRef element, the client does not need to reload the main description represented by HttpStr element. Within the current time window, only the first interval may contain NextIntervalsRef element. | IntervalsRefType, may be extended from dia:ReferenceType | 'nref' box |

The following Table 2 describes IntervalsRef, NextIntervalsRef, PreviousIntervalsRef, QoSInfoRef, MappingInfoRef a, and IntervalInfo.

TABLE 2

|  |  | Occurrence | Semantics | XML syntax (based on MPEG-21) | Pseudo-code (File format box) |
|---|---|---|---|---|---|
| QoSInfoRef, MappingInfoRef |  |  |  |  |  |
|  | Index | 1 | Indicates the order (starting from 1) of the referenced description or box (Interval, QoSInfo, MappingInfo) in the description file referenced by the next Location element. | not applicable | unsigned int(8) |
|  | Location | 1 | Provides reference to description represented by Interval, QoSInfo, or MappingInfo. | uri element in dia:ReferenceType | string (representing url) |
| IntervalInfo |  |  |  |  |  |
|  | TimeScale | 0 . . . 1 | Describes the number of time units in one second. This value is used with time-related elements, when a time unit is not specified. TimeScale element, if present, overrides the time scale provided by GeneralInfo. | integer | unsigned int(32) |
|  | StartTime | 0 . . . 1 | Indicates the start time of the interval. |  |  |
|  | Duration | 0 . . . 1 | Indicates the duration of the interval. | integer | unsigned int(32) |
|  | DefaultFragDuration | 0 . . . 1 | Indicates the default duration of fragments of the interval (except the last fragment). | integer | unsigned int(32) |
|  | DefaultContentIntLoc | 0 . . . 1 | Provides a default location for the content interval. | anyURItype | string |
|  | Last | 0 . . . 1 | If true, indicates the final interval of the content. | boolean | by flag |
| IntervalsRef, PreviousIntervalsRef NextIntervalRef |  |  |  |  |  |
|  | startTime |  | Indicates the start time of the referenced sequence of intervals/periods relative to the start time of the content (LiveStartTime for live content and 0 for on-demand content). | xs:duration |  |
|  | AvailableTime | 0 . . . 1 | Indicates the time the description of the next interval is available. The is the relative time from the start time of the content. | integer | unsigned int(32) |

TABLE 2-continued

|  | Occurrence | Semantics | XML syntax (based on MPEG-21) | Pseudo-code (File format box) |
|---|---|---|---|---|
| Index | 1 | Indicates the order (starting from 1) of the referenced interval description (or box) in the description file referenced by the next Location element. | not applicable | unsigned int(8) |
| Location | 1 | Provides reference to description file that contains Interval descriptions. | sx:anyURI type or uri element in dia:ReferenceType | string (representing url) |

The following Table 3 describes the QoSInfo element.

TABLE 3

|  |  |  | Occurrence | Semantics | XML syntax (based on MPEG-21) | Pseudo-code (File format box) |
|---|---|---|---|---|---|---|
| QoSInfo |  |  | 1 | Provides information about a list of content alternatives, such as resource characteristics and quality/utility. | QoSInfoType containing a UtilityFunction of dia:Adaptive-QoSType | 'QoSi' box |
|  | ClassSchemeRef |  | 0...1 | Provides a list of classification schemes. The classification schemes provide semantics for some terms or names. | dia:Description MetadataType | 'csmr' box |
|  |  | scheme | 1...N | Provides reference to a classification scheme. | Attr. alias & href in dia:Description MetadataType | a url string |
| (1) | Resource |  | 0...N | Each instance of Resource element describes, for a list of alternatives, characteristic values of a certain resource type (e.g., bitrate). | Element constraint of dia:UF DataType in DIA Utility-FunctionType | 'resi' box |
| (2) | AdaptionOperator |  | 0...N | Each instance of AdaptionOperator element describes, for a list of alternatives, values of a certain adaption type (e.g., remove temporal layers). | dia:UF DataType | 'adpo' box |
| (3) | Utility |  | 0...N | Each instance of Utility element describes, for a list of alternatives, values in a certain quality/utility type (e.g., MOS). | dia:UF DataType | 'util' box |
|  | UtilityRank |  | 0...1 | Describes the quality ranking for a list of alternatives. | dia:UtilityRankType | 'utir' box |
|  |  | Value | 1...N | Indicates the quality/utility rank of an alternative. The number of instances of Value element is equal to the number of alternatives. | integer | unsigned int(16) |

The following Table 4 shows common semantics of (1) Resource, (2) AdaptationOperator, and (3) Utility of Table 3.

TABLE 4

| Element (1), (2), (3) |  |  |  | Semantics | XML syntax (based on MPEG-21) | Pseudo-code (File format box) |
|---|---|---|---|---|---|---|
|  | Name |  | 1 | Describes an identifier for a certain type of the element. When the identifier is not semantically defined by the above embodiment, next three elements are used to find | Att. 'iOPinRef', ref. a CS term | unsigned int(32) |

TABLE 4-continued

| Element (1), (2), (3) | | | Semantics | XML syntax (based on MPEG-21) | Pseudo-code (File format box) |
|---|---|---|---|---|---|
| | | | semantics of the identifier in a classification scheme. | | |
| | CSref_ind | 0 . . . 1 | Indicates the reference index of a classification scheme in the list provided by ClassSchemeRef element. | Not applicable | unsigned int(16) |
| | LevelNum | 0 . . . 1 | Indicates the number of levels. | Not applicable | unsigned int(16) |
| | LevelIndex | 0 . . . 1 | Each instance of LevelIndex element represents an index value at a level of the classification scheme. | Not applicable | unsigned int(16) |
| | Value | 1 . . . N | Indicates the value of a resource type (adaptation operator, or utility) of an alternative. The number of instances of Value element is equal to the number of alternatives. | a component in dia:Vector DataType | unsigned int(32) |

The following Table 5 shows mapping information.

TABLE 5

| | | | Occurrence | Semantics | XML syntax (based on MPEG-21) | Pseudo-code (File format box) |
|---|---|---|---|---|---|---|
| MappingInfo | | | 0 . . . 1 | | MappingInfo Type | 'mapi' box |
| | AlterLocID | | 0 . . . 1 | Provides a location ID for each alternative described in QoSInfo. If AlterLocID element is not present, the first location in the location list may be used for all alternatives. | dia:IntegerVectorType | 'aloc' box |
| | | Value | 1 . . . N | Indicates a location ID for an alternative. The number of instances of this element is equal to the number of alternatives. The n$^{th}$ instance of Value element corresponds to the n$^{th}$ alternative of QoSInfo description. | integer | unsigned int(16) |
| | ReqQoS Para | | 0 . . . N | Indicates a parameter of QoSInfo that may be put in the request (for an alternative) sent by the client to the server. A parameter may be an instance of Resource, AdaptationOperator, Utility, or UtilityRank elements. | ReqQoS ParaType that extends dia:BooleanVectorType | 'reqp' box |
| | | RefIndex | 1 | Indicates instance index/reference in the instance list of Resource, AdaptationOperator, Utility and UtilityRank elements. | represented by attribute 'iOPinRef' that references an IOPin in QoSInfo | unsigned int(16) |
| | | All | 1 | If true, the parameter needs to be requested for all alternatives and ReqFlag may be skipped. | boolean | flag |
| | | ReqFlag | 0 . . . N | Each instance of ReqFlag element corresponds to an alternative. If ReqFlag is true, the request for the corresponding alternative has the parameter identified above. | component of Boolean VectorType | unsigned int(8) |
| | LocationList | | 1 | Provides a list of locations for retrieving content alternatives | LocationListType | 'locl' box |
| | | Location | 1 . . . N | Provides information of a location | LocationType | 'loca' box |

Semantics of Location elements may be further provided as shown in Table 6.

TABLE 6

| | | | Occurrence | Semantics | XML syntax (based on DIA) | Pseudo-code (MP4) |
|---|---|---|---|---|---|---|
| Location | | | 0 . . . N | | LocationType | 'loca' box |
| | LocID | | 1 | Indicate an ID of an instance of Location element. Location element is referred to by AlterLocID. | integer | unsigned int(16) |
| | StrLocation | | 0 . . . N | Provides location information of a stream of a content interval. Each stream is provided by either a stream URL or a number of fragment URLs. | StrLocationType | 'stlo' box |
| | | FragNum | 0 . . . 1 | Provides the number of fragments | integer | unsigned int(16) |
| | | Stream Url | 0 . . . 1 | Describes a URL of a stream | anyURI type | string |
| | | FragmentUrl | 0 . . . N | Describes a URL of a fragment. The number of instances of FragmentUrl element is the number of fragments. | anyURI type | string |
| | | FragTime | 0 . . . 1 | Provides durations of fragments. | dia:VectorDataType | 'frtm' box |
| | | Value | 1 . . . N | Indicates a duration of a fragment. The number of instances of Value element is the number of fragments. | integer | unsigned int(32) |
| | | RandAccess | 0 . . . 1 | Describes fragments that support random access. | dia:VectorDataType | 'rdac' box |
| | | Value | 1 . . . N | Indicates the order of a random-access fragment. | integer | unsigned int(16) |
| | | MP2TS Para | 0 . . . 1 | Describes additional parameters (beside URL) for locating a content/program in a MPEG-2 TS. | MP2TS ParaType | 'mp2p' box |
| | | PID | 0 . . . N | Describes values of PIDs of content/program in a MPEG-2 TS. | integer | unsigned int(16) |
| | | FragBoundaries | 0 . . . 1 | Describes boundaries of (virtual) fragments in a stream. The number of instances of FragBoundaries element is equal to the number of fragments of the stream. Only one type of following elements is present in a FragBoundaries instance. | FragBoundaries Type | 'frbd' box |
| | | MP2TSBoundary | 0 . . . N | Describes parameters for detecting (virtual) fragment boundary in a MPEG-2 TS. If there are two instances of MP2TSBoundary element, the two instances are starting and ending boundaries of a fragment. If there is only one instance of MP2TSBoundary element, the instance is the starting boundary. The ending boundary is right before the starting boundary of the next fragment. | MP2TS BoundaryType | 'mp2b' box |
| | | ISOFileBoundary | 1 . . . 2 | Describes parameters for detecting (virtual) fragment boundary in a file based on ISO base media file format. If there are two instances of ISOFileBoundary element, the two instances are starting and ending boundaries of a fragment. If there is only one instance of ISOFileBoundary element, the instance is the | ISOFile BoundaryType | 'isfb' box |

TABLE 6-continued

| | | Occurrence | Semantics | XML syntax (based on DIA) | Pseudo-code (MP4) |
|---|---|---|---|---|---|
| | Byte Ranges | 1 | starting boundary. The ending boundary is right before the starting boundary of the next fragment. Describes byte ranges that identify a part/fragment of a file. Parameters provided by ByteRanges element may be used for byte range options in an HTTP request. | ByteRangesType | 'brag' box |

Semantics of MP2TSBoundary, ISOFileBoundary, and ByteRanges may be further provided as shown in Table 7.

TABLE 7

| | | Occurrence | Semantics | XML syntax (based on DIA) | Pseudo-code (MP4) |
|---|---|---|---|---|---|
| MP2TSBoundary | | | | MP2TSBoundaryType | 'mp2b' box |
| | PCR_PID | 1 | Describes PID carrying PCR of the concerned content/program. | integer | unsigned int(16) |
| | PCR_base | 1 | Describes a value of a PCR base field | long | unsigned int(40) |
| | PCR_ext | 1 | Describes a value of a PCR extension field. | integer | unsigned int(16) |
| | Appearance | 1 | Describes the appearance order (e.g., $1^{st}$, $2^{nd}$) of the TS packet containing the PCR value identified by the above two elements. If there is resetting/discontinuity of PCR, a PCR value may appear more than once during an interval. | integer | unsigned int(16) |
| | Media_PID | 1...N | Describes PID of a media (e.g., video) of a program. The number of instances of Media_PID element is equal to the number of media of the program/content. | integer | unsigned int(16) |
| | Media_Offset | 1...N | Describes the offset (in TS packets of the same media PID) from the above identified PCR packet to the first media packet of a fragment. The $n^{th}$ instance of Media_Offset is associated with the $n^{th}$ instance of Media_PID. | integer | unsigned int(16) |
| ISOFileBoundary | | | | ISOFileBoundaryType | 'isfb' box |
| | SequenceNo | 1 | Describes the sequence number provided in the mfhd box. The mfhd box defines a fragment of an MP4 file. SequenceNo with a value of 0 indicates the beginning of the file. | integer | unsigned int(16) |
| ByteRanges | | | | ByteRangesType | 'brag' box |
| | Start | 1...N | Describes the starting value of a byte range. A value of '−1' means that this value in the HTTP request is missing. | integer | unsigned int(32) |
| | End | 1...N | Describes the ending value of a byte range. A value of '−1' means that this value in the HTTP request is missing. Start-End instances are present in pair. The $n^{th}$ instance of End is associated with the $n^{th}$ instance of Start. | integer | unsigned int(32) |

TABLE 7-continued

| | Occurrence | Semantics | XML syntax (based on DIA) | Pseudo-code (MP4) |
|---|---|---|---|---|
| Media_PID | 0 . . . N | Describes PID of a media (e.g., video) that needs to be extracted from the byte range of the above pair of Start-End. Media_PID element is used when the byte range is a segment of MPEG-2 TS, and all PIDs do not need to be delivered. | integer | unsigned int(16) |

Signaling of metadata obtained by a client may include different parts or levels of signaling information. Accordingly, a request from the client to a server may include parameters of different levels of details.

Main parameters of the client may be URIs, and may be associated with a query part.

Three main scenarios are examined as follows:

1) Server-Based Scenario

In the server-based scenario, the metadata provided from the server to the client may include general content information 310 and general interval information 320.

For an URI of requested content, DefaultContentIntLoc (if not, DefaultContentIntLoc) may be used. To enable the client to request a specific fragment of content, the following parameters a) and b) are defined in the query part (of the request in operation 140):

a) "fragno": Order value of the fragment in the interval
b) "fragti": Start time of the fragment in the interval For example, a request URI may be "HTTP://server.com/file.mp4?fragno=5."

2) Distributed Scenario

In the distributed scenario, the metadata provided from the server to the client may include general content information 310, general interval information 320, and QoS information 330.

In addition to the above parameters, the following QoS-related parameters a) through c) are defined in the query part (of the request in operation 140) to enable the client to request an appropriate alternative:

a) "alter": Order value of an alternative. Based on the order value of the alternative, the alternative may appear in the QoS information.
b) "oper1", "oper2", . . . , and "operN": "operi" carries a value of an $i^{th}$ adaptation operation that appears in the QoS information.
c) "res1", "res2", . . . , "resN": "resi" carries a value of an $i^{th}$ resource that appears in the QoS information.

Only one of the above three options may be used in a single request.

With typical adaptation operators and resource types, specific parameter names for better intelligibility and interoperability may be defined.

Adaptation operators are as the following a) through e).

a) audiolayers: indicates the number of scalable audio layers to be discarded.
b) temporallayers: indicates the number of temporal layers of scalable video to be discarded.
c) spatiallayers: indicates the number of spatial layers of scalable video to be discarded.
d) qualitylayers: indicates the number of quality layers of scalable video to be discarded.
e) prioritylayers: indicates the number of priority layers of scalable video to be discarded.

Resource types are as the following a) through d).

a) bitrate: indicates the average bitrate (in Kbps) of the requested alternative.
b) vertresolution: indicates the vertical resolution of the requested alternative.
c) horiresolution: indicates the horizontal resolution of the requested alternative.
d) framerate: indicates the framerate of the requested alternative.

Using the pre-defined parameters, an example of a request URI based on the bitrate may be "http://server.com/file.mp4?fragno=5 &bitrate=550."

3) Client-Based Scenario

In the client-based scenario, the metadata provided from the server to the client may include general content, general interval information, QoS information, and mapping information.

The QoS-related parameters used in the request may be indicated by a ReqQoSPara part of QoSInfo metadata. For example, when RefIndex of ReqQoSPara is 0 or null, the "alter" parameter may be used instead of other options.

When ReqQoSPara is not present in the QoSInfo metadata, the QoS-related parameters may not be used. Alternatives in this case may be implied by locations of MappingInfo.

A URI of content may be derived from rich description of MappingInfo. When content/program is conveyed in an MPEG-2 TS, one or more PIDs may be used to locate the content in the stream.

When additional information for detecting fragment boundaries are provided, the following parameters 1) through 3) for the query part (of the request in operation 140) may be used.

1) For an MPEG-2 TS boundary, Appearance, PCR_PID, PCR_base, PCR_ext, Media_PID, and Media_Offset
2) For an ISO media file boundary, SequenceNo
3) For a file considered as a raw byte-sequence, Start and End Semantics of the above parameters may be provided in semantics of a FragBoundaries element.

Start-End pairs may be used by a range header of an HTTP request message. For example, if {(Start=0, End=99); (Start=200, End=299)}, the header may be "Range: bytes=0-99,200-299."

Hereinafter, syntax representation in an XML format will be described. Representations of the above syntax elements may be provided in the XML format. Semantics of each element may be traced back in the above Tables 1 through 7.

Several elements may be extensions of several types defined in an MPEG-21 DIA. Several few elements may take several types defined in the MPEG-21 DIA.

The following Table 8 shows syntax representation of HTTPStreamingType in the XML format.

TABLE 8

```
<complexType name="HTTPStreamingType">
  <complexContent>
    <extension base="dia:DIADescriptionType">
      <sequence>
        <element name="GeneralInfo" type="GeneralInfoType"
        minOccurs="0"/>
        <choice minOccurs="0" maxOccurs="unbounded">
        <element name="IntervalsRef" type="IntervalsRefType"/>
        <element name="Interval" type="IntervalType"/>
        </choice>
      </sequence>   </complexContent>
</complexType>
```

The following Table 9 shows syntax representation of GeneralInfoType in the XML format.

TABLE 9

```
<complexType name="GeneralInfoType">
  <complexContent>
    <extension base="dia:DIADescriptionType">
      <sequence>
        <element name="TimeScale" type="integer" minOccurs="0"/>
        <element name="LiveStartTime" type="dateTime"
        minOccurs="0"/>
        <element name="Duration" type="integer" minOccurs="0"/>
        <element name="DefaultIntDuration" type="integer"
        minOccurs="0"/>
        <element name="MinUpdateTime" type="integer"
        minOccurs="0"/>
        <element name="ConsistentQoSInfo" type="boolean"
        minOccurs="0"/>
        <element name="DefaultContentLoc" type="anyURI"
        minOccurs="0"/>
      </sequence>
    </extension>
  </complexContent>
</complexType>
```

The following Table 10 shows syntax representation of IntervalRefType in the XML format.

TABLE 10

```
<complexType name="IntervalsRefType">
  <complexContent>
    <extension base="dia:ReferenceType">
      <sequence>
        <element name="AvaliableTime" type="integer" minOccurs="0"/>
      </sequence>
      <attribute name="startTime" type="xs:duration" use="optional"/>
    </extension>
  </complexContent>
</complexType>
```

The following Table 11 shows syntax representation of IntervalType in the XML format.

TABLE 11

```
<complexType name="IntervalType">
  <complexContent>
    <extension base="dia:DIADescriptionType">
      <sequence>
        <element name="IntervalInfo" type="IntervalInfoType"
        minOccurs="0"/>
        <choice minOccurs="0">
          <element name="QoSInfo" type="QoSInfoType"/>
          <element name="QoSInfoRef" type="dia:ReferenceType"/>
        </choice>
```

TABLE 11-continued

```
        <choice minOccurs="0">
          <element name="MappingInfo" type="MappingInfoType"/>
          <element name="MappingInfoRef" type="dia:Reference-
Type"/>
        </choice>
        <element name="PreviousIntervalsRef" type="IntervalsRefType"
        minOccurs="0"/>
        <element name="NextIntervalsRef" type="IntervalsRefType"
        minOccurs="0"/>
      </sequence>
    </extension>
  </complexContent>
</complexType>
```

The following Table 12 shows syntax representation of IntervalInfoType in the XML format.

TABLE 12

```
<complexType name="IntervalInfoType">
  <sequence>
    <element name="TimeScale" type="integer" minOccurs="0"/>
    <element name="StartTime" type="dateTime" minOccurs="0"/>
    <element name="Duration" type="integer" minOccurs="0"/>
    <element name="DefaultFragDuration" type="integer"
    minOccurs="0"/>
    <element name="DefaultContentIntLoc" type="anyURI"
    minOccurs="0"/>
    <element name="Last" type="boolean" minOccurs="0"/>
  </sequence>
</complexType>
```

The following Table 13 shows syntax representations of ISOFileBoundaryType and ByteRangesType in the XML format.

TABLE 13

```
<complexType name="ISOFileBoundaryType">
  <sequence>
    <element name="SequenceNo" type="integer"
    maxOccurs="unbounded"/>
  </sequence>
</complexType>
<complexType name="ByteRangesType">
  <sequence maxOccurs="unbounded">
    <element name="Start" type="integer"/>
    <element name="End" type="integer"/>
    <element name="Media_PID" type="integer" minOccurs="0"/>
  </sequence>
</complexType>
```

Hereinafter, syntax representation in an MP4 pseudo-code format will be described. Representation of the above syntax elements may be provided in the MP4 pseudo-code format.

The following Table 14 shows syntax representation of HTTPStreamingBox in the MP4 pseudo-code format.

TABLE 14

```
HTTPStreamingBox
  Box Type: 'htps'
  Container: Signaling file
  Mandatory: Yes
  Quantity: One
    Aligned(8) class HTTPStreamingBox extends Box('htps') {
    }
```

Hereinafter, Several Other Options of PeriodsRef Element Will be Described.

XInclude may be a World Wide Web Consortium (W3C) technology that provides an inclusion mechanism used to merge XML documents.

The above PeriodsRef and XInclude may be similar in using any URI type (with the Location element and href attribute) to refer to a resource/description. However, there are major differences between the above two approaches.

XInclude may be used to merge XML documents. In other words, the merged documents may need to be obtained before being optionally further processed. Conversely, PeriodsRef may be used to refer to past or future periods. The past or future periods may not always need to be merged. The intention of PeriodsRef may be to allow a user to retrieve appropriate period information only when the user wants.

In association with specific attributes/elements, startTime and availableTime of PeriodsRef may be unique for retrieval of period information. Among the attributes/elements of XInclude, "fallback" and "xpointer" may be used to improve functionality of PeriodsRef, while "parse", "encoding", "accept", and "accept-language" may be unnecessary for PeriodsRef.

Based on the above description, two additional options for referencing periods may be proposed: 1) enhanced PeriodsRef, and 2) XInclude-extending PeriodsRef.

1) Enhanced PeriodsRef: enables enhancement of existing PeriodsRef by fallback element and xpointer attribute of XInclude. The option may have an advantage of simplicity in syntax and processing. The syntax of modified PeriodsRef may be provided in Table 15 below.

2) XInclude-extending PeriodsRef: enables building of PeriodsRef by simply extending XInclude with startTime and availableTime attributes. The operation may have an advantage of the use of standard XInclude. To avoid always merging documents initially, the semantics of PeriodsRef may need to mandate that "clients are allowed to decide whether merging needs to be completed." The syntax of PeriodsRef may be provided in Table 16 below.

In the above syntax, an ids attribute may be added to indicate ids of referenced Periods used in the current media presentation. Additionally, to have consistency with the href attribute of XInclude, the Location element may be changed to an optional location attribute.

TABLE 15

```
<xs:complexType name="PeriodsRefType">
    <xs:choice minOccurs="0" maxOccurs="unbounded">
        <xs:element minOccurs="0" maxOccurs="unbounded"
        name="fallback"
        type="fallbackType"/>
        <xs:any namespace="##other" processContents="lax"
        minOccurs="0"
maxOccurs="unbounded"/>
    </xs:choice>
    <xs:attribute name="ids" type="xs:string"/>
    <xs:attribute name="location" type="xs:anyURI"/>
    <xs:attribute name="xpointer" type="xs:string"/>
    <xs:attribute name="startTime" type="xs:duration"/>
    <xs:attribute name="availableTime" type="xs:duration"/>
    <xs:anyAttribute namespace="##other" processContents="lax"/>
</xs:complexType>
<xs:complexType name="fallbackType">
    <xs:choice minOccurs="0" maxOccurs="unbounded">
        <xs:element name="PeriodsRef" type="PeriodsRefType"/>
        <xs:any namespace="##other" processContents="lax"/>
    </xs:choice>
    <xs:anyAttribute namespace="##other" processContents="lax" />
</xs:complexType>
```

TABLE 16

```
<xs:schema
...
    xmlns:xi="http://www.w3.org/2001/XInclude"
...
<xs:complexType name="PeriodsRefType">
    <xs:complexContent>
        <xs:extension base="xi:includeType">
            <xs:attribute name="ids" type="xs:string"/>
            <xs:attribute name="startTime" type="xs:duration"/>
            <xs:attribute name="availableTime" type="xs:duration"/>
            <xs:anyAttribute namespace="##other" processContents="lax"/>
        </xs:extension>
    </xs:complexContent>
</xs:complexType>
```

The semantics of the above elements/attributes may be provided as shown in Table 17.

TABLE 17

| Element or Attribute Name | Type (Attribute or Element) | Cardinality | Optionality | Description |
|---|---|---|---|---|
| MPD | E | 1 | M | Describes a root element that carries a Media Presentation Description (MPD) for a Media Presentation. |
| ... | | | | |
| Period | E | 1...N | O | Provides information of Period. |
| PeriodsRef | E | 1...N | O | Provides reference to description containing one or more instances of Period element. One or more instances of Period element represent a sequence of consecutive Period(s). The information of Period may be either included as |

TABLE 17-continued

| Element or Attribute Name | Type (Attribute or Element) | Cardinality | Optionality | Description |
|---|---|---|---|---|
| | | | | an instance of Period element or referenced by PeriodsRef element. |
| ids | A | | O. | Provides id(s) of referenced Period(s). When multiple consecutive Periods are referenced, the id's conveyed by this string are separated by semicolon. |
| locatoin | A | | O. | Provides reference to description of Period(s). |
| xpointer | A | | O. | Provides an XPointer to identify a portion of the referenced description. If xpointer attribute is absent, location attribute needs to be present. |
| startTime | A | 0...1 | O. | Indicates the start time of the referenced sequence of Periods, relative to the start time of content. StartTime element may help a client to determine whether referenced information needs to be retrieved. |
| availableTime | A | 0...1 | O. | Indicates the time the description of referenced Period(s) is available. The time is the relative time from the start time of content. If availableTime attribute is absent, the description is already available. |

Hereinafter, Period Timeline Will be Described.

Each period may have a start attribute indicating a start time of a period. However, the above approach may not be flexible in modifying a timeline of periods.

For example, to insert an advertisement period into an MPD for VOD, start times of all periods after the inserted period need to be modified. Furthermore, when the same advertisement period is played repeatedly (for example, every 1 hour), the period may be continuously inserted. In the same manner, when one or more periods are removed from an MPD, start times of remaining periods after periods are removed in space time may be modified.

In the embodiment, for flexibility of period management, the following modifications may be proposed:

1) Add a new attribute called "duration" to a Period
2) Change a current start attribute of a Period to optional
3) Add a new element called PeriodTimeline to the MPD type The PeriodTimeline element may provide information about presentation of periods based on a timeline. Semantics and syntax of the PeriodTimeline element may be provided in Tables 18 through 20 below.

Using PeriodTimeline, description of a Period may be independent of a presentation time. Accordingly, a Period may be reused (fully or partially) in the same media presentation or in another media presentation. To modify the presentation time, only the Period Timeline needs to be changed.

In addition, the PartialPlay element may allow (re)play of one or more parts of a Period. For example, after an advertisement Period is presented, a part of the advertisement Period (denoted by beginning and ending) may be occasionally repeated during the whole session.

The PeriodTimeline element may impose an explicit timeline of Periods. Without the PeriodTimeline element, the implicit timeline of Periods may be inferred from the ordered sequence of Periods. To support the replay of a Period in the case of implicit timeline, the PartialPlay element may also be provided as a child element of the Period element.

TABLE 18

| Element or Attribute Name | Type (Attribute or Element) | Cardinality | Optionality | Description |
|---|---|---|---|---|
| MPD | E | 1 | M | Describes a root element that carries a Media Presentation Description (MPD) for a Media Presentation. |
| ... | | | | |
| PeriodTimeline | E | 0...1 | O | Provides the presentation timeline of Periods of the Media Presentation. |
| PeriodsTime | E | 1...N | O | Provides time information for presenting Period. |
| id | A | | O. | Indicates an id of Period of the Media Presentation. This value is equal to the value of the id attribute of Period, if the id attribute of Period is present. If no id attributes are present, this value is equal to the appearance order of Period in the MPD. |
| start | A | | O. | Provides accurate start time of Period relative to the value of the attribute availabilityStart time of the Media Presentation. The start attribute overrides start attribute of corresponding Period (i.e., an instance of Period element). The start attribute may be present for the first Period of the timeline. For other Periods, if information about presentation duration of previous Periods is available, this value may be deduced and the attribute may be absent. |

TABLE 18-continued

| Element or Attribute Name | Type (Attribute or Element) | Cardinality | Optionality | Description |
|---|---|---|---|---|
| PartialPlay | E | 0...N | O. | Provides information for presenting a (temporal) part of Period. |
| beginning | A | | O. | Indicates a beginning point of a part of Period. This time value is relative to the beginning of the Period. |
| ending | A | | O. | Indicates an ending point of a part of Period. This time value is relative to the beginning of the Period. |
| Period | E | 1...N | M | Provides information of Period. |
| start | A | | O | Indicates a start time of Period. |
| id | A | | O | Indicates an ID of Period. When the Period is a (partial) repeat of another Period, the value of id attribute is equal to an ID or an appearance order of a referred Period. |
| duration | A | | O. | Indicates duration of Period. If start attribute is absent, duration attribute may be present. Also, for the last Period of a Media Presentation, if availabilityEndTime and SegmentTimeline are not available, the duration attribute of the Period may be present. |
| PartialPlay | E | 0...N | O. | Provides information for presenting a (temporal) part of Period. |
| beginning | A | | O. | Indicates a beginning point of a part of Period. This time value is relative to the beginning of the Period. |
| ending | A | | O. | Indicates an ending point of a part of Period. This time value is relative to the beginning of the Period. |
| Representation | E | 0...N | | Representation element contains description of Representation. |

TABLE 19

```
<?xml version="1.0" encoding="UTF-8"?>
<xs:schema
targetNamespace="urn:3GPP:ns:PSS:AdaptiveHTTPStreamingMPD:2009"
    attributeFormDefault="unqualified"
    elementFormDefault="qualified"
    xmlns:xs="http://www.w3.org/2001/XMLSchema"
    xmlns="urn:3GPP:ns:PSS:AdaptiveHTTPStreamingMPD:2009">
...
<!-- MPD Type -->
<xs:complexType name="MPDtype">
    <xs:sequence>
        <xs:element minOccurs="0" name="ProgramInformation"
type="ProgramInformationType"/>
        <xs:element minOccurs="0" name="PeriodTimeline"
type="PeriodTimelineType"/>
        <xs:element maxOccurs="unbounded" name="Period"
        type="PeriodType"/>
        <xs:any namespace="##other" processContents="lax"
        minOccurs="0"
maxOccurs="unbounded"/>
    </xs:sequence>
    <xs:attribute default="OnDemand" name="type"
    type="PresentationType"/>
    <xs:attribute name="availabilityStartTime" type="xs:dateTime"/>
    <xs:attribute name="availabilityEndTime" type="xs:dateTime"/>
    <xs:attribute name="mediaPresentationDuration" type="xs:duration"/>
```

TABLE 19-continued

```
    <xs:attribute name="minimumUpdatePeriodMPD" type="xs:duration"/>
    <xs:attribute name="minBufferTime" type="xs:duration"
    use="required"/>
    <xs:attribute name="timeShiftBufferDepth" type="xs:duration"/>
    <xs:attribute name="baseUrl" type="xs:anyURI"/>
    <xs:anyAttribute namespace="##other" processContents="lax"/>
</xs:complexType>
<!-- Type of presentation - live or on-demand -->
<xs:simpleType name="PresentationType">
    <xs:restriction base="xs:string">
        <xs:enumeration value="OnDemand"/>
        <xs:enumeration value="Live"/>
    </xs:restriction>
</xs:simpleType>
<!-- Period Timeline -->
<xs:complexType name="PeriodTimelineType">
    <xs:sequence>
        <xs:element maxOccurs="unbounded" name="PeriodTime"
type="PeriodTimeType"/>
        <xs:any namespace="##other" processContents="lax"
        minOccurs="0"
maxOccurs="unbounded"/>
    </xs:sequence>
    <xs:anyAttribute namespace="##other" processContents="lax"/>
</xs:complexType>
```

TABLE 20

```
<xs:complexType name="PeriodTimeType">
    <xs:sequence>
        <xs:element minOccurs="0" maxOccurs="unbounded" name="PartialPlay"
type="PartialPlayType"/>
        <xs:any namespace="##other" processContents="lax" minOccurs="0"
maxOccurs="unbounded"/>
    </xs:sequence>
    <xs:attribute name="id" type="xs:string" use="required"/>
    <xs:attribute name="start" type="xs:duration"/>
```

TABLE 20-continued

```
    <xs:anyAttribute namespace="##other" processContents="lax"/>
  </xs:complexType>
  <xs:complexType name="PartialPlayType">
    <xs:sequence>
      <xs:any namespace="##other" processContents"="lax" minOccurs="0" maxOccurs="unbounded"/>
    </xs:sequence>
    <xs:attribute name="beginning" type="xs:duration"/>
    <xs:attribute name="ending" type="xs:duration"/>
    <xs:anyAttribute namespace="##other" processContents="lax"/>
  </xs:complexType>
  <!-- Period of a presentation -->
  <xs:complexType name="PeriodType">
    <xs:sequence>
      <xs:element minOccurs="0" name="SegmentInfoDefault" type="SegmentInfoDefaultType"/>
      <xs:element minOccurs="0" maxOccurs="unbounded" name="PartialPlay" type="PartialPlayType"/>
      <xs:element minOccurs="0" maxOccurs="unbounded" name="Representation" type="RepresentationType"/>
      <xs:any namespace="##other" processContents="lax" minOccurs="0" maxOccurs="unbounded"/>
    </xs:sequence>
    <xs:attribute name="start" type="xs:duration"/>
    <xs:attribute name="duration" type="xs:duration"/>
    <xs:attribute name="id" type="xs:string"/>
    <xs:attribute default="false" name="segmentAlignmentFlag" type="xs:boolean"/>
    <xs:attribute default="false" name="bitStreamSwitchingFlag" type="xs:boolean"/>
    <xs:anyAttribute namespace="##other" processContents="lax"/>
  </xs:complexType>
...
...
</xs:schema>
```

As no repeated Period needs to contain representation description again, the minimum number of Representation instances may be changed to 0.

Rather than using the id attribute directly, a special attribute indicating an id value of a previous Period to be repeated may be used.

Figure 5:
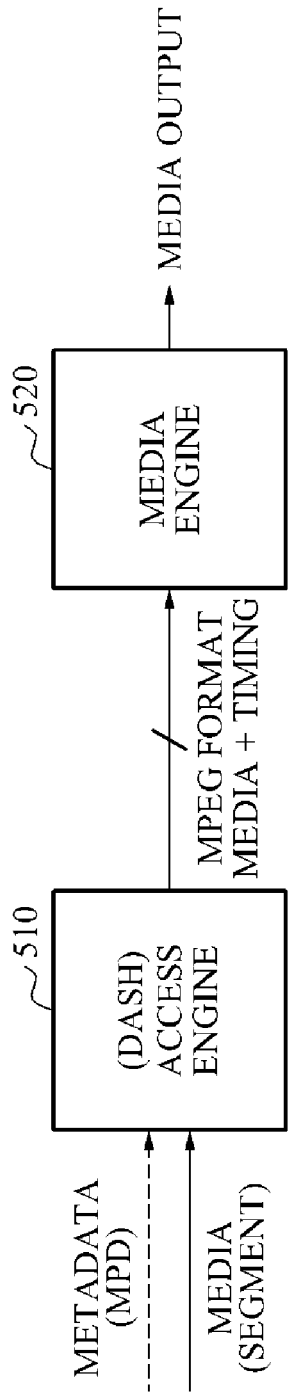
FIG. 5 is a diagram illustrating a configuration of a client according to an embodiment of the present invention.

FIG. 5 is a diagram illustrating a configuration of a client according to an embodiment of the present invention.

The client 100 includes an access engine 510, and a media engine 520.

The access engine 510 may be a DASH access engine.

The access engine 510 may receive metadata (for example, an MPD) from the server 110.

The access engine 510 may form requests, and may issue the formed requests to the server 110.

The access engine 510 may receive content (for example, segments or parts of the segments) from the server 110. The access engine 510 may provide the content to the media engine 520.

An output of the access engine 510 may include media (or a part of the media) of an MPEG container (for example, an ISO/IEC 14492-12 ISO base media file format, or an ISO/IEC 13818-2 MPEG-2 TS). Additionally, the output of the access engine 510 may include timing information used to map internal timing of the media to a timeline of a media presentation.

The media engine 520 may play back the provided content. Specifically, the media engine 520 may output the media using the media and the timing information that are output from the access engine 510.

Technical information according to the embodiments of the present invention described above with reference to FIGS. 1 through 4 may equally be applied to the present embodiment. Accordingly, further description thereof will be omitted.

The method according to the above-described embodiments of the present invention may be recorded in computer-readable media including program instructions to implement various operations embodied by a computer. The media may also include, alone or in combination with the program instructions, data files, data structures, and the like. The program instructions recorded on the media may be those specially designed and constructed for the purposes of the embodiments, or they may be of the kind well-known and available to those having skill in the computer software arts. Examples of computer-readable media include magnetic media such as hard disks, floppy disks, and magnetic tape; optical media such as CD ROM disks and DVDs; to magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention, or vice versa.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A method for providing media, the method comprising:
    receiving metadata of media, the metadata comprising one or more periods;

processing the received metadata and extracting information included in the metadata, wherein the metadata includes a range attribute;

requesting a segment suitable for a specific interval based on a request for bytes of a resource indicated by a URL that are designated by the range attribute;

accessing segments of the media based on information provided by the metadata;

decoding and rendering data of the media that is included in the segments;

wherein each of the periods comprises one or more representations of the media, wherein each of the representations starts from a beginning point of a period including each of the representation and continues to an ending point of the period, and comprises one or more segments; and wherein determining the start of a first period among one or more period comprises:

when a start attribute exists in the first period element of the first period, a start time of the first period is equivalent to a value of the start attribute, when a start attribute does not exist in the first period element of the first period, and when a second period element of the second period includes a duration attribute, the start time of the first period is obtained by adding a value of the duration attribute of the second period element to a start time of the second period, and when a start attribute does not exist in the first period element of the first period, and when the first period is the first of the one or more periods, the start time of the first period is zero.

2. The method of claim 1, wherein the metadata is a Media Presentation Description (MPD) of the media.

3. The method of claim 1, wherein each of the periods is defined by a period element.

4. The method of claim 3, wherein the period element comprises a start attribute indicating a start time of a period.

* * * * *